United States Patent
Davis

(10) Patent No.: US 8,873,144 B2
(45) Date of Patent: Oct. 28, 2014

(54) WIRE GRID POLARIZER WITH MULTIPLE FUNCTIONALITY SECTIONS

(75) Inventor: Mark Alan Davis, Springville, UT (US)

(73) Assignee: Moxtek, Inc., Orem, UT (US)

( * ) Notice: Subject to any disclaimer, the term of this patent is extended or adjusted under 35 U.S.C. 154(b) by 371 days.

(21) Appl. No.: 13/430,945

(22) Filed: Mar. 27, 2012

(65) Prior Publication Data

US 2013/0077164 A1 Mar. 28, 2013

Related U.S. Application Data

(60) Provisional application No. 61/487,061, filed on May 17, 2011.

(51) Int. Cl.
*G02B 5/30* (2006.01)

(52) U.S. Cl.
CPC .................................. *G02B 5/3058* (2013.01)
USPC ............................. 359/485.05; 359/487.03

(58) Field of Classification Search
CPC .................. G02B 5/3058; G02F 2001/133548
USPC ........................................ 359/485.05, 487.03
See application file for complete search history.

(56) References Cited

U.S. PATENT DOCUMENTS

| | | | |
|---|---|---|---|
| 2,224,214 A | 12/1940 | Brown | |
| 2,237,567 A | 4/1941 | Land | |
| 2,287,598 A | 6/1942 | Brown | |
| 2,391,451 A | 12/1945 | Fischer | |
| 2,403,731 A | 7/1946 | MacNeille | |
| 2,605,352 A | 7/1952 | Fishcer | |
| 2,748,659 A | 6/1956 | Geffcken et al. | |
| 2,813,146 A | 11/1957 | Glenn | |
| 2,815,452 A | 12/1957 | Mertz | |
| 2,887,566 A | 5/1959 | Marks | |
| 3,046,839 A | 7/1962 | Bird et al. | |
| 3,084,590 A | 4/1963 | Glenn, Jr. | |
| 3,202,039 A | 8/1965 | Lang et al. | |
| 3,213,753 A | 10/1965 | Rogers | |
| 3,235,630 A | 2/1966 | Doherty et al. | |
| 3,291,550 A | 12/1966 | Bird et al. | |
| 3,291,871 A | 12/1966 | Francis | |

(Continued)

FOREIGN PATENT DOCUMENTS

| | | |
|---|---|---|
| AU | 2003267964 | 12/2003 |
| CH | 0296391 | 2/1954 |

(Continued)

OTHER PUBLICATIONS

Wang et al. "High-performance nanowire-grid polarizers" Optical Society of America. 2005, pp. 195-197, vol. 30, No. 2.

(Continued)

*Primary Examiner* — Frank Font
(74) *Attorney, Agent, or Firm* — Thorpe North & Western LLP

(57) ABSTRACT

A wire grid polarizer with multiple functionality sections. Separate and discrete sections can include a difference in pitch p, a difference in wire width w, a difference in wire height h, a difference in wire material, a difference in coating on top of the wires, a difference in thin film between the wires and the substrate, a difference in substrate between the wires, a difference in number of layers of separate wires, and/or a difference in wire cross-sectional shape.

20 Claims, 3 Drawing Sheets

(56) References Cited

U.S. PATENT DOCUMENTS

| | | |
|---|---|---|
| 3,293,331 A | 12/1966 | Doherty |
| 3,436,143 A | 4/1969 | Garrett |
| 3,479,168 A | 11/1969 | Bird et al. |
| 3,536,373 A | 10/1970 | Bird et al. |
| 3,566,099 A | 2/1971 | Makas |
| 3,627,431 A | 12/1971 | Komarniski |
| 3,631,288 A | 12/1971 | Rogers |
| 3,653,741 A | 4/1972 | Marks |
| 3,731,986 A | 5/1973 | Fergason |
| 3,857,627 A | 12/1974 | Harsch |
| 3,857,628 A | 12/1974 | Strong |
| 3,876,285 A | 4/1975 | Schwarzmüller |
| 3,877,789 A | 4/1975 | Marie |
| 3,912,369 A | 10/1975 | Kashnow |
| 3,969,545 A | 7/1976 | Slocum |
| 4,009,933 A | 3/1977 | Firester |
| 4,025,164 A | 5/1977 | Doriguzzi et al. |
| 4,025,688 A | 5/1977 | Nagy et al. |
| 4,049,944 A | 9/1977 | Garvin et al. |
| 4,068,260 A | 1/1978 | Ohneda et al. |
| 4,073,571 A | 2/1978 | Grinberg et al. |
| 4,104,598 A | 8/1978 | Abrams |
| 4,181,756 A | 1/1980 | Fergason |
| 4,220,705 A | 9/1980 | Sugibuchi et al. |
| 4,221,464 A | 9/1980 | Pedinoff et al. |
| 4,268,127 A | 5/1981 | Oshima et al. |
| 4,289,381 A | 9/1981 | Garvin et al. |
| 4,294,119 A | 10/1981 | Soldner |
| 4,308,079 A | 12/1981 | Venables et al. |
| 4,441,791 A | 4/1984 | Hornbeck |
| 4,456,515 A | 6/1984 | Krueger et al. |
| 4,466,704 A | 8/1984 | Schuler et al. |
| 4,492,432 A | 1/1985 | Kaufmann et al. |
| 4,512,638 A | 4/1985 | Sriram et al. |
| 4,514,479 A | 4/1985 | Ferrante |
| 4,515,441 A | 5/1985 | Wentz |
| 4,515,443 A | 5/1985 | Bly |
| 4,532,619 A | 7/1985 | Sugiyama et al. |
| 4,560,599 A | 12/1985 | Regen |
| 4,679,910 A | 7/1987 | Efron et al. |
| 4,688,897 A | 8/1987 | Grinberg et al. |
| 4,701,028 A | 10/1987 | Clerc et al. |
| 4,711,530 A | 12/1987 | Nakanowatari et al. |
| 4,712,881 A | 12/1987 | Shurtz, II et al. |
| 4,724,436 A | 2/1988 | Johansen et al. |
| 4,743,092 A | 5/1988 | Pistor |
| 4,743,093 A | 5/1988 | Oinen |
| 4,759,611 A | 7/1988 | Downey, Jr. |
| 4,759,612 A | 7/1988 | Nakatsuka et al. |
| 4,763,972 A | 8/1988 | Papuchon et al. |
| 4,795,233 A | 1/1989 | Chang |
| 4,799,776 A | 1/1989 | Yamazaki et al. |
| 4,818,076 A | 4/1989 | Heppke et al. |
| 4,840,757 A | 6/1989 | Blenkhorn |
| 4,865,670 A | 9/1989 | Marks |
| 4,870,649 A | 9/1989 | Bobeck |
| 4,893,905 A | 1/1990 | Efron et al. |
| 4,895,769 A | 1/1990 | Land et al. |
| 4,904,060 A | 2/1990 | Grupp |
| 4,913,529 A | 4/1990 | Goldenberg et al. |
| 4,915,463 A | 4/1990 | Barbee, Jr. |
| 4,939,526 A | 7/1990 | Tsuda |
| 4,946,231 A | 8/1990 | Pistor |
| 4,966,438 A | 10/1990 | Mouchart et al. |
| 4,974,941 A | 12/1990 | Gibbons et al. |
| 4,991,937 A | 2/1991 | Urino |
| 5,029,988 A | 7/1991 | Urino |
| 5,039,185 A | 8/1991 | Uchida et al. |
| 5,061,050 A | 10/1991 | Ogura |
| 5,087,985 A | 2/1992 | Kitaura et al. |
| 5,092,774 A | 3/1992 | Milan |
| 5,113,285 A | 5/1992 | Franklin et al. |
| 5,115,305 A | 5/1992 | Baur |
| 5,122,887 A | 6/1992 | Mathewson |
| 5,122,907 A | 6/1992 | Slocum |
| 5,139,340 A | 8/1992 | Okumura |
| 5,157,526 A | 10/1992 | Kondo et al. |
| 5,163,877 A | 11/1992 | Marpert et al. |
| 5,177,635 A | 1/1993 | Keilmann |
| 5,196,926 A | 3/1993 | Lee |
| 5,196,953 A | 3/1993 | Yeh et al. |
| 5,198,921 A | 3/1993 | Aoshima et al. |
| 5,204,765 A | 4/1993 | Mitsui et al. |
| 5,206,674 A | 4/1993 | Puech et al. |
| 5,216,539 A | 6/1993 | Boher et al. |
| 5,222,907 A | 6/1993 | Katabuchi et al. |
| 5,225,920 A | 7/1993 | Kasazumi et al. |
| 5,235,443 A | 8/1993 | Barnik et al. |
| 5,235,449 A | 8/1993 | Imazeki et al. |
| 5,239,322 A | 8/1993 | Takanashi et al. |
| 5,245,471 A | 9/1993 | Iwatsuka et al. |
| 5,267,029 A | 11/1993 | Kurematsu |
| 5,279,689 A | 1/1994 | Shvartsman |
| 5,295,009 A | 3/1994 | Barnik et al. |
| 5,298,199 A | 3/1994 | Hirose et al. |
| 5,305,143 A | 4/1994 | Taga et al. |
| 5,325,218 A | 6/1994 | Willett et al. |
| 5,333,072 A | 7/1994 | Willett |
| 5,349,192 A | 9/1994 | Mackay |
| 5,357,370 A | 10/1994 | Miyatake et al. |
| 5,383,053 A | 1/1995 | Hegg et al. |
| 5,387,953 A | 2/1995 | Minoura et al. |
| 5,391,091 A | 2/1995 | Nations |
| 5,401,587 A | 3/1995 | Motohiro et al. |
| 5,422,756 A | 6/1995 | Weber |
| 5,430,573 A | 7/1995 | Araujo et al. |
| 5,436,761 A | 7/1995 | Kamon |
| 5,455,589 A | 10/1995 | Huguenin et al. |
| 5,466,319 A | 11/1995 | Zager et al. |
| 5,477,359 A | 12/1995 | Okazaki |
| 5,485,499 A | 1/1996 | Pew et al. |
| 5,486,935 A | 1/1996 | Kalmanash |
| 5,486,949 A | 1/1996 | Schrenk et al. |
| 5,490,003 A | 2/1996 | Van Sprang |
| 5,499,126 A | 3/1996 | Abileah et al. |
| 5,504,603 A | 4/1996 | Winker et al. |
| 5,506,704 A | 4/1996 | Broer et al. |
| 5,508,830 A | 4/1996 | Imoto et al. |
| 5,510,215 A | 4/1996 | Prince et al. |
| 5,513,023 A | 4/1996 | Fritz et al. |
| 5,513,035 A | 4/1996 | Miyatake et al. |
| 5,517,356 A | 5/1996 | Araujo et al. |
| 5,535,047 A | 7/1996 | Hornbeck |
| 5,548,427 A | 8/1996 | May |
| 5,555,186 A | 9/1996 | Shioya |
| 5,557,343 A | 9/1996 | Yamagishi |
| 5,559,634 A | 9/1996 | Weber |
| 5,570,213 A | 10/1996 | Ruiz et al. |
| 5,570,215 A | 10/1996 | Omae et al. |
| 5,574,580 A | 11/1996 | Ansley |
| 5,576,854 A | 11/1996 | Schmidt et al. |
| 5,579,138 A | 11/1996 | Sannohe et al. |
| 5,594,561 A | 1/1997 | Blanchard |
| 5,599,551 A | 2/1997 | Kelly |
| 5,600,383 A | 2/1997 | Hornbeck |
| 5,602,661 A | 2/1997 | Schadt et al. |
| 5,609,939 A | 3/1997 | Petersen et al. |
| 5,612,820 A | 3/1997 | Schrenk et al. |
| 5,614,035 A | 3/1997 | Nadkarni |
| 5,619,356 A | 4/1997 | Kozo et al. |
| 5,620,755 A | 4/1997 | Smith, Jr. et al. |
| 5,626,408 A | 5/1997 | Heynderickx et al. |
| 5,638,197 A | 6/1997 | Gunning, III et al. |
| 5,652,667 A | 7/1997 | Kurogane |
| 5,658,060 A | 8/1997 | Dove |
| 5,686,979 A | 11/1997 | Weber et al. |
| 5,706,063 A | 1/1998 | Hong |
| 5,706,131 A | 1/1998 | Ichimura et al. |
| 5,719,695 A | 2/1998 | Heimbuch |
| 5,731,246 A | 3/1998 | Bakeman et al. |
| 5,748,368 A | 5/1998 | Tamada et al. |
| 5,748,369 A | 5/1998 | Yokota |
| 5,751,388 A | 5/1998 | Larson |
| 5,751,466 A | 5/1998 | Dowling et al. |

(56) References Cited

U.S. PATENT DOCUMENTS

| | | |
|---|---|---|
| 5,767,827 A | 6/1998 | Kobaysashi et al. |
| 5,798,819 A | 8/1998 | Hattori et al. |
| 5,808,795 A | 9/1998 | Shimomura et al. |
| 5,826,959 A | 10/1998 | Atsuchi |
| 5,826,960 A | 10/1998 | Gotoh et al. |
| 5,828,489 A | 10/1998 | Johnson et al. |
| 5,833,360 A | 11/1998 | Knox et al. |
| 5,838,403 A | 11/1998 | Jannson et al. |
| 5,841,494 A | 11/1998 | Hall |
| 5,844,722 A | 12/1998 | Stephens et al. |
| 5,864,427 A | 1/1999 | Fukano et al. |
| 5,872,653 A | 2/1999 | Schrenk et al. |
| 5,886,754 A | 3/1999 | Kuo |
| 5,890,095 A | 3/1999 | Barbour et al. |
| 5,898,521 A | 4/1999 | Okada |
| 5,899,551 A | 5/1999 | Neijzen et al. |
| 5,900,976 A | 5/1999 | Handschy et al. |
| 5,907,427 A | 5/1999 | Scalora et al. |
| 5,912,762 A | 6/1999 | Li et al. |
| 5,914,818 A | 6/1999 | Tejada et al. |
| 5,917,562 A | 6/1999 | Woodgate et al. |
| 5,918,961 A | 7/1999 | Ueda |
| 5,930,050 A | 7/1999 | Dewald |
| 5,943,171 A | 8/1999 | Budd et al. |
| 5,958,345 A | 9/1999 | Turner et al. |
| 5,965,247 A | 10/1999 | Jonza et al. |
| 5,969,861 A | 10/1999 | Ueda et al. |
| 5,973,833 A | 10/1999 | Booth et al. |
| 5,978,056 A | 11/1999 | Shintani et al. |
| 5,982,541 A | 11/1999 | Li et al. |
| 5,986,730 A | 11/1999 | Hansen et al. |
| 5,991,075 A | 11/1999 | Katsuragawa et al. |
| 5,991,077 A | 11/1999 | Carlson et al. |
| 6,005,918 A | 12/1999 | Harris et al. |
| 6,008,871 A | 12/1999 | Okumura |
| 6,008,951 A | 12/1999 | Anderson |
| 6,010,121 A | 1/2000 | Lee |
| 6,016,173 A | 1/2000 | Crandall |
| 6,018,841 A | 2/2000 | Kelsay et al. |
| 6,049,428 A | 4/2000 | Khan et al. |
| 6,053,616 A | 4/2000 | Fujimori et al. |
| 6,055,103 A | 4/2000 | Woodgate et al. |
| 6,056,407 A | 5/2000 | Iinuma et al. |
| 6,062,694 A | 5/2000 | Oikawa et al. |
| 6,075,235 A | 6/2000 | Chun |
| 6,081,312 A | 6/2000 | Aminaka et al. |
| 6,081,376 A | 6/2000 | Hansen et al. |
| 6,082,861 A | 7/2000 | Dove et al. |
| 6,089,717 A | 7/2000 | Iwai |
| 6,096,155 A | 8/2000 | Harden et al. |
| 6,096,375 A | 8/2000 | Ouderkirk et al. |
| 6,100,928 A | 8/2000 | Hata |
| 6,108,131 A | 8/2000 | Hansen et al. |
| 6,122,103 A | 9/2000 | Perkins et al. |
| 6,122,403 A | 9/2000 | Rhoads |
| 6,124,971 A | 9/2000 | Ouderkirk et al. |
| 6,141,075 A | 10/2000 | Okumuro et al. |
| 6,147,728 A | 11/2000 | Okumura et al. |
| 6,172,813 B1 | 1/2001 | Tadic-Galeb et al. |
| 6,172,816 B1 | 1/2001 | Tadic-Galeb et al. |
| 6,181,386 B1 | 1/2001 | Knox |
| 6,181,458 B1 | 1/2001 | Brazas, Jr. et al. |
| 6,185,041 B1 | 2/2001 | TadicGaleb et al. |
| 6,208,463 B1 | 3/2001 | Hansen et al. |
| 6,215,547 B1 | 4/2001 | Ramanujan et al. |
| 6,234,634 B1 | 5/2001 | Hansen et al. |
| 6,243,199 B1 | 6/2001 | Hansen et al. |
| 6,247,816 B1 | 6/2001 | Cipolla et al. |
| 6,249,378 B1 | 6/2001 | Shimamura et al. |
| 6,250,762 B1 | 6/2001 | Kuijper |
| 6,251,297 B1 | 6/2001 | Komura et al. |
| 6,282,025 B1 | 8/2001 | Huang et al. |
| 6,288,840 B1 | 9/2001 | Perkins et al. |
| 6,291,797 B1 | 9/2001 | Koyama et al. |
| 6,310,345 B1 | 10/2001 | Pittman et al. |
| 6,339,454 B1 | 1/2002 | Knox |
| 6,340,230 B1 | 1/2002 | Bryars et al. |
| 6,345,895 B1 | 2/2002 | Maki et al. |
| 6,348,995 B1 | 2/2002 | Hansen et al. |
| 6,375,330 B1 | 4/2002 | Mihalakis |
| 6,390,626 B2 | 5/2002 | Knox |
| 6,398,364 B1 | 6/2002 | Bryars |
| 6,406,151 B1 | 6/2002 | Fujimori |
| 6,409,525 B1 | 6/2002 | Hoelscher et al. |
| 6,411,749 B2 | 6/2002 | Teng et al. |
| 6,424,436 B1 | 7/2002 | Yamanaka |
| 6,426,837 B1 | 7/2002 | Clark et al. |
| 6,447,120 B1 | 9/2002 | Hansen et al. |
| 6,452,724 B1 | 9/2002 | Hansen et al. |
| 6,460,998 B1 | 10/2002 | Watanabe |
| 6,473,236 B2 | 10/2002 | Tadic-Galeb et al. |
| 6,486,997 B1 | 11/2002 | Bruzzone et al. |
| 6,490,017 B1 | 12/2002 | Huang et al. |
| 6,496,239 B2 | 12/2002 | Seiberle |
| 6,496,287 B1 | 12/2002 | Seiberle et al. |
| 6,511,183 B2 | 1/2003 | Shimizu et al. |
| 6,520,645 B2 | 2/2003 | Yamamoto et al. |
| 6,532,111 B2 | 3/2003 | Kurtz et al. |
| 6,547,396 B1 | 4/2003 | Svardal et al. |
| 6,580,471 B2 | 6/2003 | Knox |
| 6,583,930 B1 | 6/2003 | Schrenk et al. |
| 6,585,378 B2 | 7/2003 | Kurtz et al. |
| 6,624,936 B2 | 9/2003 | Kotchick et al. |
| 6,643,077 B2 | 11/2003 | Magarill et al. |
| 6,654,168 B1 | 11/2003 | Borrelli |
| 6,661,475 B1 | 12/2003 | Stahl et al. |
| 6,661,484 B1 | 12/2003 | Iwai et al. |
| 6,665,119 B1 | 12/2003 | Kurtz |
| 6,666,556 B2 | 12/2003 | Hansen et al. |
| 6,669,343 B2 | 12/2003 | Shahzad et al. |
| 6,698,891 B2 | 3/2004 | Kato |
| 6,704,469 B1 | 3/2004 | Xie et al. |
| 6,710,921 B2 | 3/2004 | Hansen et al. |
| 6,714,350 B2 | 3/2004 | Silverstein et al. |
| 6,721,096 B2 | 4/2004 | Bruzzone et al. |
| 6,739,723 B1 | 5/2004 | Haven et al. |
| 6,746,122 B2 | 6/2004 | Knox |
| 6,764,181 B2 | 7/2004 | Magarill et al. |
| 6,769,779 B1 | 8/2004 | Ehrne et al. |
| 6,781,640 B1 | 8/2004 | Huang |
| 6,785,050 B2 | 8/2004 | Lines et al. |
| 6,788,461 B2 | 9/2004 | Kurtz et al. |
| 6,805,445 B2 | 10/2004 | Silverstein et al. |
| 6,809,864 B2 | 10/2004 | Martynov et al. |
| 6,809,873 B2 | 10/2004 | Cobb |
| 6,811,274 B2 | 11/2004 | Olczak |
| 6,813,077 B2 | 11/2004 | Borrelli et al. |
| 6,816,290 B2 | 11/2004 | Mukawa |
| 6,821,135 B1 | 11/2004 | Martin |
| 6,823,093 B2 | 11/2004 | Chang et al. |
| 6,829,090 B2 | 12/2004 | Katsumata et al. |
| 6,844,971 B2 | 1/2005 | Silverstein et al. |
| 6,846,089 B2 | 1/2005 | Stevenson et al. |
| 6,859,303 B2 | 2/2005 | Wang et al. |
| 6,876,784 B2 | 4/2005 | Nikolov et al. |
| 6,896,371 B2 | 5/2005 | Shimizu et al. |
| 6,897,926 B2 | 5/2005 | Mi et al. |
| 6,899,440 B2 | 5/2005 | Bierhuizen |
| 6,900,866 B2 | 5/2005 | Kurtz et al. |
| 6,909,473 B2 | 6/2005 | Mi et al. |
| 6,920,272 B2 | 7/2005 | Wang |
| 6,922,287 B2 | 7/2005 | Wiki et al. |
| 6,926,410 B2 | 8/2005 | Weber et al. |
| 6,927,915 B2 | 8/2005 | Nakai |
| 6,934,082 B2 | 8/2005 | Allen et al. |
| 6,943,941 B2 | 9/2005 | Flagello et al. |
| 6,947,215 B2 | 9/2005 | Hoshi |
| 6,954,245 B2 | 10/2005 | Mi et al. |
| 6,972,906 B2 | 12/2005 | Hasman et al. |
| 6,976,759 B2 | 12/2005 | Magarill et al. |
| 6,981,771 B1 | 1/2006 | Arai et al. |
| 7,009,768 B2 | 3/2006 | Sakamoto |
| 7,013,064 B2 | 3/2006 | Wang |
| 7,023,512 B2 | 4/2006 | Kurtz et al. |

(56) References Cited

U.S. PATENT DOCUMENTS

| | | | |
|---|---|---|---|
| 7,023,602 B2 | 4/2006 | Aastuen et al. |
| 7,025,464 B2 | 4/2006 | Beeson et al. |
| 7,046,422 B2 | 5/2006 | Kimura et al. |
| 7,046,441 B2 | 5/2006 | Huang et al. |
| 7,046,442 B2 | 5/2006 | Suganuma |
| 7,050,233 B2 | 5/2006 | Nikolov et al. |
| 7,050,234 B2 | 5/2006 | Gage et al. |
| 7,075,602 B2 | 7/2006 | Sugiura et al. |
| 7,075,722 B2 | 7/2006 | Nakai |
| 7,085,050 B2 | 8/2006 | Florence |
| 7,099,068 B2 | 8/2006 | Wang et al. |
| 7,113,335 B2 | 9/2006 | Sales |
| 7,116,478 B2 | 10/2006 | Momoki et al. |
| 7,129,183 B2 | 10/2006 | Mori et al. |
| 7,131,737 B2 | 11/2006 | Silverstein et al. |
| 7,142,363 B2 | 11/2006 | Sato et al. |
| 7,142,375 B2 | 11/2006 | Nikolov et al. |
| 7,155,073 B2 | 12/2006 | Momoki et al. |
| 7,158,302 B2 | 1/2007 | Chiu et al. |
| 7,159,987 B2 | 1/2007 | Sakata |
| 7,177,259 B2 | 2/2007 | Nishi et al. |
| 7,184,115 B2 | 2/2007 | Mi et al. |
| 7,185,984 B2 | 3/2007 | Akiyama |
| 7,203,001 B2 | 4/2007 | Deng et al. |
| 7,213,920 B2 | 5/2007 | Matsui et al. |
| 7,220,371 B2 | 5/2007 | Suganuma |
| 7,221,420 B2 | 5/2007 | Silverstein et al. |
| 7,221,501 B2 | 5/2007 | Flagello et al. |
| 7,227,684 B2 | 6/2007 | Wang et al. |
| 7,230,766 B2 | 6/2007 | Rogers |
| 7,234,816 B2 | 6/2007 | Bruzzone et al. |
| 7,236,655 B2 | 6/2007 | Momoki et al. |
| 7,255,444 B2 | 8/2007 | Nakashima et al. |
| 7,256,938 B2 | 8/2007 | Barton et al. |
| 7,268,946 B2 | 9/2007 | Wang |
| 7,298,475 B2 | 11/2007 | Gandhi et al. |
| 7,306,338 B2 | 12/2007 | Hansen et al. |
| 7,375,887 B2 | 5/2008 | Hansen |
| 7,414,784 B2 | 8/2008 | Mi et al. |
| 7,545,564 B2 | 6/2009 | Wang |
| 7,561,332 B2 | 7/2009 | Little et al. |
| 7,570,424 B2 | 8/2009 | Perkins et al. |
| 7,619,816 B2 | 11/2009 | Deng et al. |
| 7,630,133 B2 | 12/2009 | Perkins |
| 7,670,758 B2 | 3/2010 | Wang et al. |
| 7,692,860 B2 | 4/2010 | Sato et al. |
| 7,722,194 B2 | 5/2010 | Amako et al. |
| 7,755,718 B2 | 7/2010 | Amako et al. |
| 7,789,515 B2 | 9/2010 | Hansen |
| 7,800,823 B2 | 9/2010 | Perkins |
| 7,813,039 B2 * | 10/2010 | Perkins et al. ......... 359/485.05 |
| 7,944,544 B2 | 5/2011 | Amako et al. |
| 7,961,393 B2 | 6/2011 | Perkins |
| 8,009,355 B2 | 8/2011 | Nakai |
| 8,027,087 B2 | 9/2011 | Perkins et al. |
| 8,248,697 B2 * | 8/2012 | Kenmochi ............... 359/485.05 |
| 8,493,658 B2 * | 7/2013 | Nishida et al. ......... 359/485.05 |
| 8,611,007 B2 * | 12/2013 | Davis ...................... 359/485.05 |
| 8,619,215 B2 * | 12/2013 | Kumai ........................... 349/96 |
| 8,696,131 B2 * | 4/2014 | Sawaki ............................ 353/20 |
| 2001/0006421 A1 | 7/2001 | Parriaux |
| 2001/0053023 A1 | 12/2001 | Kameno et al. |
| 2002/0003661 A1 | 1/2002 | Nakai |
| 2002/0015135 A1 | 2/2002 | Hanson |
| 2002/0040892 A1 | 4/2002 | Koyama et al. |
| 2002/0122235 A1 | 9/2002 | Kurtz et al. |
| 2002/0167727 A1 | 11/2002 | Hansen et al. |
| 2002/0176166 A1 | 11/2002 | Schuster |
| 2002/0181824 A1 | 12/2002 | Huang et al. |
| 2002/0191286 A1 | 12/2002 | Gale et al. |
| 2003/0058408 A1 | 3/2003 | Magarill et al. |
| 2003/0072079 A1 | 4/2003 | Silverstein et al. |
| 2003/0081178 A1 | 5/2003 | Shimizu et al. |
| 2003/0081179 A1 | 5/2003 | Pentico et al. |
| 2003/0117708 A1 | 6/2003 | Kane |
| 2003/0156325 A1 | 8/2003 | Hoshi |
| 2003/0161029 A1 | 8/2003 | Kurtz et al. |
| 2003/0193652 A1 | 10/2003 | Pentico et al. |
| 2003/0202157 A1 | 10/2003 | Pentico et al. |
| 2003/0218722 A1 | 11/2003 | Tsao et al. |
| 2003/0223118 A1 | 12/2003 | Sakamoto |
| 2003/0223670 A1 | 12/2003 | Nikolov et al. |
| 2003/0224116 A1 | 12/2003 | Chen et al. |
| 2004/0008416 A1 | 1/2004 | Okuno |
| 2004/0042101 A1 | 3/2004 | Wang |
| 2004/0047039 A1 | 3/2004 | Wang et al. |
| 2004/0047388 A1 | 3/2004 | Wang et al. |
| 2004/0051928 A1 | 3/2004 | Mi |
| 2004/0070829 A1 | 4/2004 | Kurtz et al. |
| 2004/0071425 A1 | 4/2004 | Wang |
| 2004/0095637 A1 | 5/2004 | Nikolov et al. |
| 2004/0120041 A1 | 6/2004 | Silverstein et al. |
| 2004/0125449 A1 | 7/2004 | Sales |
| 2004/0165126 A1 | 8/2004 | Ooi et al. |
| 2004/0169924 A1 | 9/2004 | Flagello et al. |
| 2004/0174596 A1 | 9/2004 | Umeki |
| 2004/0201889 A1 | 10/2004 | Wang et al. |
| 2004/0201890 A1 | 10/2004 | Crosby |
| 2004/0218270 A1 | 11/2004 | Wang |
| 2004/0227994 A1 | 11/2004 | Ma et al. |
| 2004/0233362 A1 | 11/2004 | Kashima |
| 2004/0240777 A1 | 12/2004 | Woodgate et al. |
| 2004/0258355 A1 | 12/2004 | Wang et al. |
| 2005/0008839 A1 | 1/2005 | Cramer et al. |
| 2005/0018308 A1 | 1/2005 | Cassarley et al. |
| 2005/0045799 A1 | 3/2005 | Deng et al. |
| 2005/0046941 A1 | 3/2005 | Satoh et al. |
| 2005/0078374 A1 | 4/2005 | Tairo et al. |
| 2005/0084613 A1 | 4/2005 | Wang et al. |
| 2005/0088739 A1 | 4/2005 | Chiu et al. |
| 2005/0122587 A1 | 6/2005 | Ouderkirk et al. |
| 2005/0128567 A1 | 6/2005 | Wang et al. |
| 2005/0128587 A1 | 6/2005 | Suganuma |
| 2005/0152033 A1 | 7/2005 | Kang et al. |
| 2005/0179995 A1 | 8/2005 | Nikolov et al. |
| 2005/0180014 A1 | 8/2005 | Nikolov et al. |
| 2005/0181128 A1 | 8/2005 | Nikolov et al. |
| 2005/0190445 A1 | 9/2005 | Fukuzaki |
| 2005/0195485 A1 | 9/2005 | Hirai et al. |
| 2005/0201656 A1 | 9/2005 | Nikolov et al. |
| 2005/0206847 A1 | 9/2005 | Hansen et al. |
| 2005/0213043 A1 | 9/2005 | Nakashima et al. |
| 2005/0259324 A1 | 11/2005 | Flagello et al. |
| 2005/0271091 A1 | 12/2005 | Wang |
| 2005/0275944 A1 | 12/2005 | Wang et al. |
| 2005/0277063 A1 | 12/2005 | Wang et al. |
| 2006/0001969 A1 | 1/2006 | Wang et al. |
| 2006/0061862 A1 | 3/2006 | Mi et al. |
| 2006/0072074 A1 | 4/2006 | Matsui et al. |
| 2006/0072194 A1 | 4/2006 | Lee |
| 2006/0087602 A1 | 4/2006 | Kunisada et al. |
| 2006/0092513 A1 | 5/2006 | Momoki |
| 2006/0103810 A1 | 5/2006 | Ma et al. |
| 2006/0113279 A1 | 6/2006 | Little |
| 2006/0118514 A1 | 6/2006 | Little et al. |
| 2006/0119937 A1 | 6/2006 | Perkins |
| 2006/0127829 A1 | 6/2006 | Deng et al. |
| 2006/0127830 A1 | 6/2006 | Deng et al. |
| 2006/0187416 A1 | 8/2006 | Ouchi et al. |
| 2006/0192960 A1 | 8/2006 | Renes et al. |
| 2006/0215263 A1 | 9/2006 | Mi et al. |
| 2006/0238715 A1 | 10/2006 | Hirata et al. |
| 2006/0268207 A1 | 11/2006 | Tan et al. |
| 2007/0146644 A1 | 6/2007 | Ma et al. |
| 2007/0183035 A1 | 8/2007 | Asakawa et al. |
| 2007/0195676 A1 | 8/2007 | Hendriks et al. |
| 2007/0217008 A1 | 9/2007 | Wang et al. |
| 2007/0223349 A1 | 9/2007 | Shimada et al. |
| 2007/0242187 A1 | 10/2007 | Yamaki et al. |
| 2007/0242228 A1 | 10/2007 | Chen et al. |
| 2007/0242352 A1 | 10/2007 | MacMaster |
| 2007/0297052 A1 | 12/2007 | Wang et al. |
| 2008/0037101 A1 | 2/2008 | Jagannathan et al. |
| 2008/0038467 A1 | 2/2008 | Jagannathan et al. |

(56) References Cited

U.S. PATENT DOCUMENTS

| | | | |
|---|---|---|---|
| 2008/0055549 | A1 | 3/2008 | Perkins |
| 2008/0055719 | A1 | 3/2008 | Perkins |
| 2008/0055720 | A1 | 3/2008 | Perkins |
| 2008/0055721 | A1 | 3/2008 | Perkins |
| 2008/0055722 | A1 | 3/2008 | Perkins |
| 2008/0055723 | A1* | 3/2008 | Gardner et al. ............... 359/486 |
| 2008/0094547 | A1 | 4/2008 | Sugita et al. |
| 2008/0316599 | A1 | 12/2008 | Wang et al. |
| 2009/0009865 | A1* | 1/2009 | Nishida et al. ............... 359/486 |
| 2009/0040607 | A1 | 2/2009 | Amako et al. |
| 2009/0041971 | A1 | 2/2009 | Wang et al. |
| 2009/0053655 | A1 | 2/2009 | Deng et al. |
| 2009/0109377 | A1 | 4/2009 | Sawaki et al. |
| 2010/0103517 | A1 | 4/2010 | Davis et al. |
| 2010/0188747 | A1* | 7/2010 | Amako et al. ............... 359/486 |
| 2010/0225832 | A1* | 9/2010 | Kumai ............... 349/8 |
| 2010/0239828 | A1 | 9/2010 | Cornaby |
| 2010/0328768 | A1 | 12/2010 | Lines |
| 2010/0328769 | A1 | 12/2010 | Perkins |
| 2011/0080640 | A1 | 4/2011 | Kaida et al. |
| 2011/0096396 | A1 | 4/2011 | Kaida et al. |
| 2012/0008205 | A1 | 1/2012 | Perkins |
| 2012/0075699 | A1 | 3/2012 | Davis |

FOREIGN PATENT DOCUMENTS

| | | |
|---|---|---|
| CN | 1692291 | 11/2005 |
| DE | 296391 | 2/1950 |
| DE | 3707984 A1 | 9/1988 |
| DE | 10327963 | 1/2005 |
| DE | 10341596 | 4/2005 |
| DE | 10 2004 041222 | 3/2006 |
| EP | 407830 B1 | 1/1991 |
| EP | 0731456 | 9/1996 |
| EP | 1239308 | 2/2002 |
| JP | 56156815 | 12/1981 |
| JP | 58-042003 | 3/1983 |
| JP | 61122626 | 6/1986 |
| JP | 1028675 | 1/1989 |
| JP | 02-308106 | 12/1990 |
| JP | 2308106 | 12/1990 |
| JP | 3005706 | 1/1991 |
| JP | H 03084502 | 4/1991 |
| JP | 3126910 | 5/1991 |
| JP | 04 366916 | 6/1991 |
| JP | 4-12241 | 1/1992 |
| JP | 4331913 | 11/1992 |
| JP | 5134115 | 5/1993 |
| JP | 5288910 | 11/1993 |
| JP | 5341234 | 12/1993 |
| JP | 6138413 | 5/1994 |
| JP | 06-174907 | 6/1994 |
| JP | 6202042 | 7/1994 |
| JP | 7005316 | 1/1995 |
| JP | 0772428 | 3/1995 |
| JP | 7-146469 | 6/1995 |
| JP | 7202266 | 8/1995 |
| JP | 7294850 | 11/1995 |
| JP | 7294851 | 11/1995 |
| JP | 7318861 | 12/1995 |
| JP | 9015534 | 1/1997 |
| JP | 9090122 | 4/1997 |
| JP | 9090129 | 4/1997 |
| JP | 9178943 | 7/1997 |
| JP | 9212896 | 8/1997 |
| JP | 9288211 | 11/1997 |
| JP | 10-003078 | 1/1998 |
| JP | 10073722 A | 3/1998 |
| JP | 10084502 | 3/1998 |
| JP | 10-153706 | 6/1998 |
| JP | 10-260403 | 9/1998 |
| JP | 11-014814 | 1/1999 |
| JP | 1-164819 | 3/1999 |
| JP | 11064794 | 3/1999 |
| JP | 11142650 | 5/1999 |
| JP | 11-174396 | 7/1999 |
| JP | 11237507 | 8/1999 |
| JP | 11-258603 | 9/1999 |
| JP | 11-306581 | 11/1999 |
| JP | 2000-147487 | 5/2000 |
| JP | 2000284117 | 10/2000 |
| JP | 2001074935 | 3/2001 |
| JP | 2003502708 | 1/2003 |
| JP | 2004157159 | 6/2004 |
| JP | 2004309903 | 11/2004 |
| JP | 2005151154 | 5/2005 |
| JP | 20054513547 | 5/2005 |
| JP | 2005195824 | 7/2005 |
| JP | 2006047813 | 2/2006 |
| JP | 2006-133402 | 5/2006 |
| JP | 2006201540 | 8/2006 |
| KR | 2003-0079268 | 10/2003 |
| KR | 10-2003-0090021 | 11/2003 |
| KR | 10-2004-0046137 | 6/2004 |
| KR | 10-2005-0017871 | 2/2005 |
| KR | 10-0707083 | 4/2007 |
| SU | 1283685 | 1/1987 |
| SU | 1781659 A1 | 12/1992 |
| WO | WO96/15474 | 5/1996 |
| WO | WO 99/59005 | 11/1999 |
| WO | WO0070386 | 11/2000 |
| WO | WO 01/51964 | 7/2001 |
| WO | WO 02/21205 | 3/2002 |
| WO | WO 02/077588 | 10/2002 |
| WO | WO03/069381 | 8/2003 |
| WO | WO 03/069381 | 8/2003 |
| WO | WO03/107046 | 12/2003 |
| WO | WO2004013684 | 2/2004 |
| WO | WO2005/065182 | 7/2005 |
| WO | WO2005/101112 | 10/2005 |
| WO | WO2006/014408 | 2/2006 |
| WO | WO 2006/036546 | 4/2006 |

OTHER PUBLICATIONS

Wang et al. "Fabrication of a new broadband waveguide polarizer with a double-layer 190 nm period metal-gratings using nanoimprint lithography." Journal Vac. Sci. Technology B, Nov./Dec. 1999, pp. 2957-2960, vol. 17, No. 6.

Savas et al. "Achromatic interferometric lithography for 100-nm-period gratings and grids." Journal Vac. Sci. Technology B, Nov./Dec. 1995, pp. 2732-2735, vol. 13, No. 6.

Haisma et al. "Mold-assisted nanolithography: a process for reliable pattern replication." Journal Vac. Sci. Technology B, Nov./Dec. 1996, pp. 4124-4128, vol. 14, No. 6.

Wang et al. "High-performance large-area ultra-broadband (UV to IR) nanowire-grid polarizers and polarizing beam-splitters." Proc. of SPIE 2005, pp. 1-12, vol. 5931.

Wang et al. "Monolithically integrated isolators based on nanowire-grid polarizers." IEEE, Photonics Technology Letters, Feb. 2005, pp. 396-398, vol. 17, No. 2.

Deng et al. "Multiscale structures for polarization control by using imprint and UV lithography." Proc. of SPIE, 2005, pp. 1-12. vol. 6003.

Kostal et al. "MEMS Meets Nano-optics the marriage of MEMES and nano-optics promises a new and viable platform for tunable optical filters." www.fiberoptictechnology.net, Fiber Optic Technology, Nov. 2005, pp. 8-13.

Kostal et al. "Adding parts for a greater whole." SPIE's oeMagazine, May 2003, pp. 24-26.

Deng et al. "Wideband antireflective polarizers based on integrated diffractive multilayer microstructures." Optics Letters, Feb. 1, 2006, pp. 344-346, vol. 31., No. 3.

Chen, et al. "Novel polymer patterns formed by lithographically induced self-assembly (LISA).", American Chemical Society, Jan. 2005, pp. 818-821, vol. 21, No. 3.

Park, et al. "Nano-optics redefine rules for optical processing." NanoOptic Corp, 3 pages.

Baur, "A new type of beam splitting polarizer cube." Meadowlark Optics, 2005, pp. 1-9.

(56) References Cited

OTHER PUBLICATIONS

Zhang et al., "A broad-angle polarization beam splitter based on a simple dielectric periodic structure." Optices Express, Oct. 29, 2007, 6 pages, vol. 15, No. 22.
Compact Disc Audio, http://hyperphusics.phy-astr.gsu.edu/hbase/audio/cdplay.html.
Robinson et al., "Wide Field of View Compensation Scheme for Cube Polarizing Beam Splitters." SID 03 Digest, pp. 1-4, www.colorlink.com.
ProFlux, www.moxtek.comm pp. 1-4.
Pentico, Eric et al., "New, High Performance, Durable Polarizers for Projection Displays." SID 01 Digest, 2001, pp. 1287-1289.
Brummelaer et al., "Beam combining optical components," Chara Technical Report, Jan. 5, 1998, pp. TR61-1 to TR 61-17, No. 61.
Bruzzone, et al.,"High-performance LCoS optical engine using cartesian polarizer technlogy," SID 03 Digest, 2003, pp. 1-4.
Fritsch, et al., "A liquid-crystal phase modulator for large-screen projection." IEEE, Sep. 1989, pp. 1882-1887, vol. 36, No. 9.
Deguzman et al., "Stacked subwavelength gratings as circular polarization filters." Applied Optices, Nov. 1, 2001, pp. 5731-5737, vol. 40, No. 31.
Tyan et al., "Polarizing beam splitter based on the anisotropic spectral reflectivity characteristic of form-birefringent multilayer gratings." Optics Letters, May 15, 1996, pp. 761-763, vol. 21, No. 10.
Tamada et al., "Aluminum-wire grid polarizer for a compact magneto-optic pickup device." 2 pages.
Maystre & Dainty, Modern Analysis of Scattering Phenomena Proceeding from International Workshop held at Domaine deTournon, Aix en Provence, France Sep. 5-8, 1990.
Wang, et al., "Innovatic High-Performance Nanowrie-Grid Polarizers and integrated Isolators, " IEEE Journal of Selected Topics in Quantum Electronics, pp. 241-253, vol. 11 No. 1 Jan./Feb. 2005.
Lloyd William Taylor, Manual of Advanced Undergraduate Experiments in Physics, p. 302 (1959).
Flanders, "Application of .100 Δ linewidth structures fabricated by shadowing techniques." J. Vac. Sci. Technol., 19(4), Nov./Dec. 1981.
Kuta et al. "Coupled-wave analysis of lamellar metal transmission gratings for the visible and the infrared." J. Opt. Soc. Am. A/vol. 12, No. 5 /May 1995.
Lochbihler et al. "Diffraction from highly conducting wire gratings of arbitrary cross-section." Journal of Modern Optics, 1993, vol. 40, No. 7, pp. 1273-1298.
Novak et al., "Far infrared polarizing grids for use at cryogenic temperatures." Applied Optics, Aug. 15, 1989/vol. 28, No. 15, pp. 3425-3427.
Auton et al, "Grid Polarizers for Use in the Near Infrared." Infrared Physics, 1972, vol. 12, pp. 95-100.
Stenkamp et al, "Grid polarizer for the visible spectral region." SPIE vol. 2213 pp. 288-296, 1994.
Handbook of Optics, 1978, pp. 10-68-10-77.
Handbook of Optics vol. II, $2^{nd}$ Edition, pp. 3.32-3.35, 1978.
Glytsis et al, "High-spatial-frequency binary and multilevel stairstep gratings: polarization-selective mirrors and broadband antireflection surfaces." Applied Optics Aug. 1, 1992 vol. 31, No. 22 pp. 4459-4470.
Auton, "Infrared Transmission Polarizers by Photolithography." Applied Optics Jun. 1967 vol. 6, No. 6, pp. 1023-1027.
Haggans et al., "Lamellar gratings as polarization components for specularly reflected beams." Journal of Modern Optics, 1993, vol. 40, No. 4, pp. 675-686.
Nordin et al., "Micropolarizer array for infrared imaging polarimetry." J. Op. Soc. Am. A. vol. 16 No. 5 , May 1999.
Bird et al., "The Wire Grid as a Near-Infrared Polarizer." J. Op. Soc. Am. vol. 50 No. 9 (1960).
Optics $9^{th}$ Edition, pp. 338-339 (1980).
Whitbourn et al, "Phase shifts in transmission line models of thin periodic metal grids." Applied Optics Aug. 15, 1989 vol. 28, No. 15, pp. 3511-3515.
Enger et al, "Optical elements with ultrahigh spatial-frequency surface corrugations." Applied Optics Oct. 15, 1983, vol. 22, No. 20 pp. 3220-3228.
Knop, "Reflection Grating Polarizer for the Infrared." Optics Communications vol. 26, No. 3, Sep. 1978.
Hass et al, "Sheet Infrared Transmission Polarizers." Applied Optics Aug. 1965, vol. 4, No. 8 pp. 1027-1031.
Flanders, "Submicron periodicity gratings as artificial anisotropic dielectrics." Appl. Phys. Lett. 42 (6), Mar. 15, 1983, pp. 492-494.
Li Li et al , "Visible broadband, wide-angle, thin-film multilayer polarizing beam splitter." Applied Optics May 1, 1996, vol. 35, No. 13, pp. 2221-2224.
Sonek et al., "Ultraviolet grating polarizers." J. Vac. Sci. Technol., 19(4), Nov./Dec. 1981, pp. 921-923.
N.M. Ceglio, Invited Review "Revolution in X-Ray Optics." J. X-Ray Science & Tech. 1, 7-78 (1989).
Dainty, et al, "Measurements of light scattering by characterized random rough surface." Waves in Random Media 3 (1991).
DeSanto et al, "Rough surface scattering." Waves in Random Media 1 (1991).
Lavin, "Specular Reflection." Monographs on App. Opt. No. 2, Sep. 1971.
Zanzucchi et al., "Corrosion Inhibitors for Aluminum Films." David Sarnoff Research Center, Princeton, NJ 08543-5300, vol. 135, No. 6, pp. 1370-1376, J. Electrochem. Soc., Jun. 1988.
Moshier et al. "The Corrosion and Passively of Aluminum Exposed to Dilute Sodium Sulfate Solutions." Corrosion Science vol. 27. No. 8 pp. 785-801 1987.
Scandurra, et al. "Corrosion Inhibition of Al Metal in Microelectronic Devices Assemble in Plastic Packages." Journal of the Electrochemical Society, 148 (8) B289-B292 (2001).
Takano, Kuniyoshi et al. "Cube polarizers by the use of metal particles in anodic alumina films." Applied Optics, vol. 33, No. 16, 3507-3512, Jun. 1, 1994.
Lopez, et al. "Wave-plate polarizing beam splitter based on a form-birefringent multilayer grating." Optics Letters, vol. 23, No. 20, pp. 1627-1629, Oct. 15, 1998.
Chen, J. et al. "Optimum film compensation modes for TN and VA LCDs." SID 98 Digest, pp. 315-318, 1998.
Richter, Ivan et al. "Design considerations of form birefringent microstructures." Applied Optics, vol. 34, No. 14, pp. 2421-2429, May 10, 1995.
Tyan, Rong-Chung et al. "Design, fabrication, and characterization of form-birefringent multilayer polarizing beam splitter." Optical Society of America, vol. 14, No. 7, pp. 1627-1636, Jul. 1997.
Ho, G H et al. "the mechanical-optical properties of wire-grid type polarizer in projection display system." SID 02 Digest, pp. 648-651, 2002.
Kostal, Hubert, NanoTechnology "using advanced lithography to pattern nano-optic devices." www.solid-state.com, Sep. 2005, p. 26 and 29.
Kostal, Hubert "Nano-optics: robust, optical devices for demanding applications." Military & Aerospace Electronics, Jul. 2005, 6 pages.
Kostal, Hubert "Nano-optic devices enable integrated fabrication." www.laserfocuswold.com, Jun. 2004 pp. 155, 157-159.
Wang, Jian et al. "Free-Space nano-optical devices and integration: design, fabrication, and manufacturing." Bell Labs Technical Journal, 2005, pp. 107-127, vol. 10, No. 3.
Wang et al. "Diffractive optics: nanoimprint lithography enables fabrication of subwavelength optics." LaserFocusWorld, htlp://lfw.pennnet.com/Articles/Articie_Dispaly.cf . . . Apr. 19, 2006, 6 pages.
U.S. Appl. No. 13/234,444, filed Aug. 16, 2011; Raymond T. Perkins.
U.S. Appl. No. 13/075,470, filed Mar. 30, 2011; Mark Alan Davis.
U.S. Appl. No. 13/224,719, filed Sep. 2, 2011; Mark Alan Davis.
U.S. Appl. No. 13/495,269, filed Jun. 13, 2012; Michael Lines.

* cited by examiner

WIRE GRID POLARIZER WITH MULTIPLE FUNCTIONALITY SECTIONS

CLAIM OF PRIORITY

Priority is claimed to U.S. Provisional Patent Application Ser. No. 61/487061, filed on May 17, 2011, which is hereby incorporated herein by reference in its entirety.

BACKGROUND

Polarized light can improve vision systems and can be used in televisions, computer projectors, medical vision systems, military vision equipment, etc. It can be beneficial to have adjacent polarizing sections, such as adjacent wire grid polarizers, that have a difference in angular orientation of the wires between the different sections. This can allow the light to be polarized in a different direction through different sections. This difference can be used to provide real-time, multiple views of an object. For example, see U.S. Pat. Nos. 6,075,235 and 7,375,887. Although the different polarization due to different wire grid angles is helpful, it would be beneficial to have more real-time views of an object than can be provided by adjacent wire grid polarizers with different wire grid angles.

It is beneficial for a wire grid polarizer to have high transmission of one polarization Tp and low transmission of another polarization Ts. Some structural characteristics of wire grid polarizers, such as a decreased wire height h, increases both Tp, which is usually desirable, and Ts, which is usually undesirable. Other structural characteristics of wire grid polarizers, such as increased wire height h, decreases both Tp, which is usually undesirable, and Ts, which is usually desirable. Thus, there can be a trade-off between optimization of Tp and optimization of Ts. For some vision equipment, it would be beneficial to have adjacent wire grid polarizers in which one is optimized for Tp and an adjacent section is optimized for Ts.

Polarizers optimized for one wavelength, or range of wavelengths, may not be suitable for polarization of another wavelength, or range of wavelengths. Objects appear differently under different wavelengths of light. For example, visible, ultraviolet, and infrared light emanating from an object, or even different wavelengths within visible, ultraviolet, or infrared can be detected and compared for analysis of the object. It would be beneficial to have a polarizer optimized for each of these wavelengths or wavelength ranges.

SUMMARY

It has been recognized that it would be advantageous to have multiple polarizer sections to provide more real-time views of an object. It has been recognized that it would be advantageous to have multiple polarizer sections, with different sections polarized for different wavelengths of light and/or different needs, such as absorption, transmission and/or contrast. The present invention is directed to a wire grid polarizer with multiple functionality sections that satisfies these needs.

The wire grid polarizer comprises a substrate with separate and discrete sections of different wire grids disposed over and attached to the substrate. The wire grids comprise substantially parallel elongated wires disposed over the substrate. The different wire grids or sections have different wire grid structures with respect to one another. The different structure can include a difference in pitch, a difference in wire width, a difference in wire height, a difference in wire material, a difference in coating on top of the wires, a difference in thin film between the wires and the substrate, a difference in substrate between the wires, a difference in number of layers of separate wires, and/or a difference in wire cross-sectional shape wherein at least one shape is non-rectangular. The different structure can include a combination of more than one of the before mentioned differences. The different structure can also include a difference in angular orientation.

The various differences described herein can be used to optimize polarizer section(s) for specific wavelengths of light. For example, at least one section could be optimized for (1) polarization of infrared light; (2) polarization of visible light; (3) polarization of ultraviolet light; (4) polarization of x-rays; (5) polarization of a particular wavelength or narrow range of wavelengths; (6) improved transmission; (7) polarization contrast; (8) absorption; or (9) reflection. Multiple of these characteristics could be combined in a single section. Different sections could have different characteristics. For example, one section may have high transmission and be optimized for polarization of visible light and another section could have high contrast and be optimized for polarization of ultraviolet light.

DEFINITIONS

Figure 1:
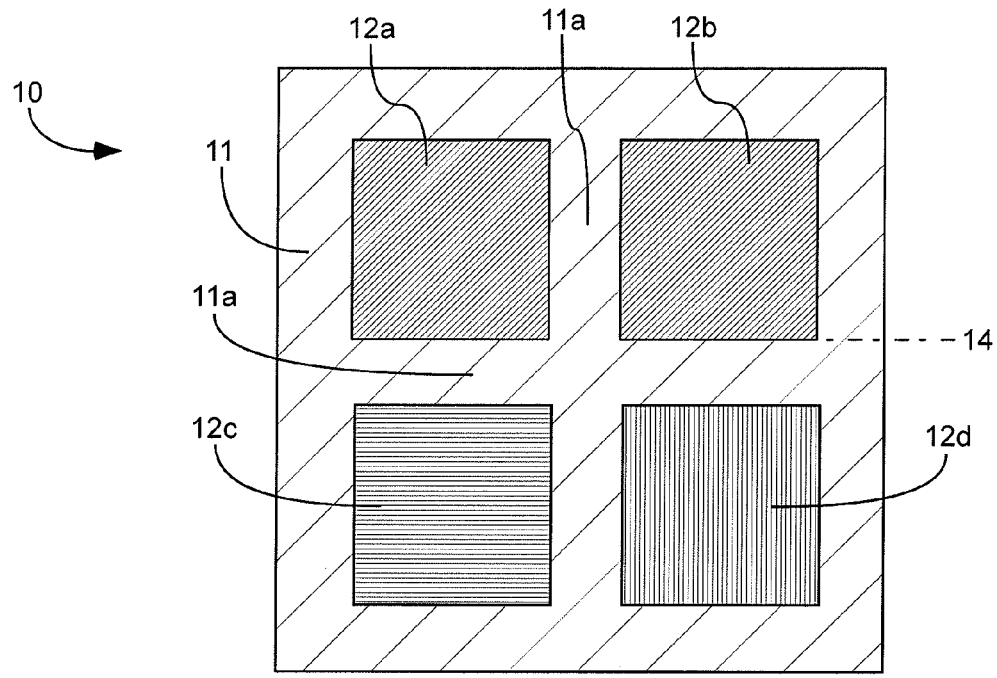
FIG. 1 is a schematic top view of a wire grid polarizer with multiple functionality sections in accordance with an embodiment of the present invention.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As illustrated in FIG. 1, a wire grid polarizer 10 with multiple functionality sections 12a-d is shown comprising a substrate 11 with separate and discrete sections 12a-d of different wire grids disposed over and attached to the substrate 11. The wire grids comprise substantially parallel elongated wires 13 disposed over the substrate 11. The different wire grids or sections 12 have different wire grid structures with respect to one another. The different structure can include a difference in pitch p, a difference in wire width w, a difference in wire height h, a difference in wire material, a difference in coating 35 on top of the wires 13, a difference in thin film 43 between the wires 13 and the substrate 11, a difference in substrate between the wires 51, a difference in number of layers of separate wires 13, and/or a difference in wire cross-sectional shape wherein at least one shape is non-rectangular. The different structure can include a combination of more than one of the before mentioned differences. The different structure can also include a difference in angular orientation.

The various differences described herein can be used to optimize polarizer section(s) for specific purposes. For example, at least one section could be optimized for (1) polarization of infrared light; (2) polarization of for visible light; (3) polarization of ultraviolet light; (4) polarization of x-rays; (5) polarization of a particular wavelength or narrow range of wavelengths; (6) improved transmission; (7) polarization contrast; (8) absorption; or (9) reflection. Multiple of these characteristics could be combined in a single section. Different sections could have different characteristics. For example, one section may have high transmission and be optimized for polarization of visible light and another section could have high contrast and be optimized for polarization of ultraviolet light.

The number of different sections, or groups of sections in which each group is different from any other group, can be at least 2 different sections or groups, at least 3 different sections or groups, at least 4 different sections or groups, or at least 5 different sections or groups.

One difference, that can be combined with other differences described herein, can be a difference in angular orientation as shown in FIG. 1. Sections 12a-b have a different angle with respect to reference line 14 than section 12c or section 12d.

Also shown in FIG. 1 is a boundary region 11a between the separate and discrete sections 12 wherein no wire grid is present. The surface of the substrate 11 in the boundary region 11a can have a material, such as wire material 33 for example, disposed on top of the substrate 11 in the boundary region 11a. Thus in the sections 12a-d the wire material can be formed into wires, whereas in the boundary region 11a, wire material may be present, but not formed into wires. The boundary region can surround the sections, thus completely separating or isolating one section from another.

Alternatively, the wires can be formed in both the sections 12 and in the boundary region 11a, then wires in the boundary region can be substantially modified or destroyed, similar to modification of the edge of a wire grid polarizer described in U.S. patent application Ser. No. 13/425,865, filed on Mar. 21, 2012, which is hereby incorporated herein by reference in its entirety.

Figure 2:
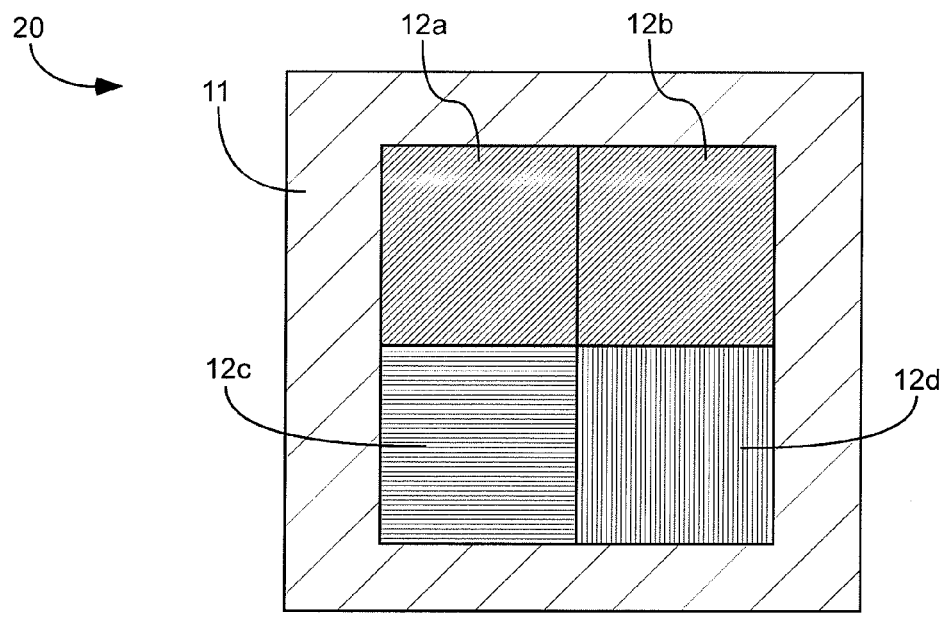
FIG. 2 is a schematic top view of a wire grid polarizer with multiple functionality sections in accordance with an embodiment of the present invention.

As shown in FIG. 2, a wire grid polarizer 20 can have separate sections that are disposed adjacent to each other and touch each other so that there is no boundary region between separate sections. A single wire grid polarizer, not shown, can include some different sections that touch and some different sections that are separate.

Figure 3:
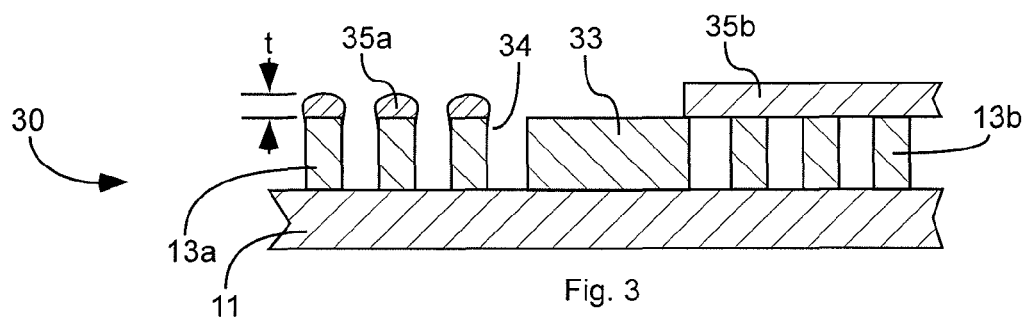
FIG. 3 is a schematic cross-sectional side view of a wire grid polarizer with multiple functionality sections, showing a difference in coating on top of the wires, in accordance with an embodiment of the present invention.

As shown in FIG. 3, a wire grid polarizer 30 can include a difference in coating 35 on top of the wires 13. The difference can be a different coating material, such as for example a material on one section that is absorptive of incoming light and either no coating, or a coating that improves reflectivity of one polarization of the incoming light, on another section. The coating 35 can be disposed in different locations on the wires between the different sections. For example, one coating 35 may be applied by shadow deposition and disposed primarily on one side of the wires 13. Another coating 35 may be deposited as a conformal coating. Another coating 35 may be segmented film deposition as described in U.S. patent application Ser. No. 13/075,470, filed on Mar. 30, 2011, incorporated herein by reference.

The difference in coating 35 can be a substantially different coating thickness (such as more than 20 nanometers, more than 50 nanometers, or more than 100 nanometers) between the different sections 12. The difference can be a segmented coating 35a over wire grid group 13a in one section and a continuous coating layer 35b over wire grid group 13b in another section, as shown in FIG. 3. The difference can be a different number of layers of coating in one section compared to another section. The difference can be touching segmented coatings on at least one section and separate, non-touching segmented coatings on at least one different section.

Figure 4:
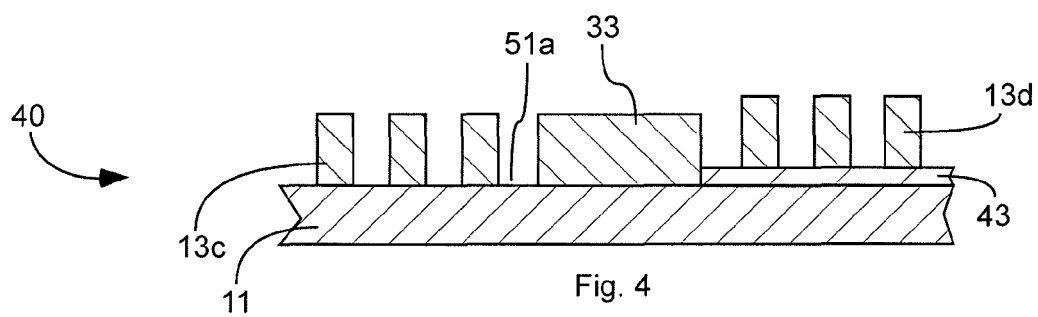
FIG. 4 is a schematic cross-sectional side view of a wire grid polarizer with multiple functionality sections, showing difference in thin film between the wires and the substrate, in accordance with an embodiment of the present invention.

As shown in FIG. 4, a wire grid polarizer 40 can include a difference in thin film 43 between the wires 13 and the substrate 11. The difference can include at least one thin film layer 43 in at least one section between the wires 13d and the substrate 11 and no thin film layer between the wires 13c and the substrate 11 in at least one other section. The difference can include a different number of thin film layers 43 and/or different thin film materials between the different sections.

Various thin films and coatings are described in U.S. Pat. Nos. 7,570,424, 7,813,039 and US Patent Publication Number 2008/0278811; all incorporated herein by reference.

Figure 5:
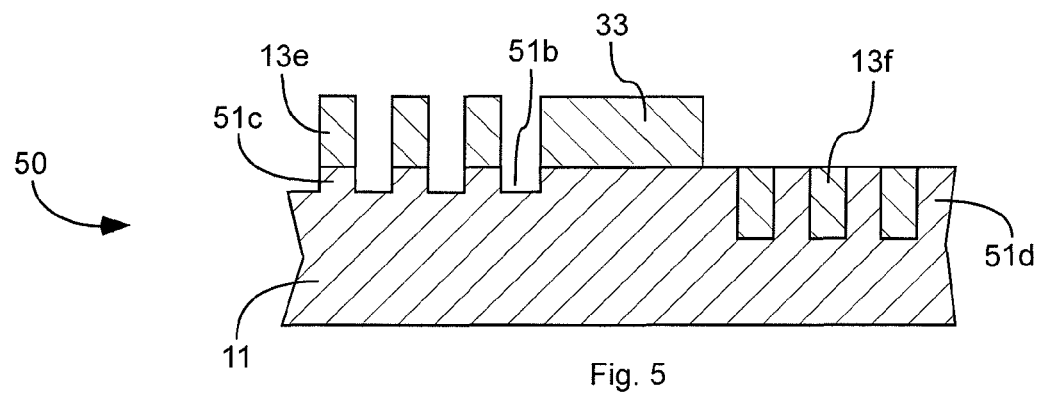
FIG. 5 is a schematic cross-sectional side view of a wire grid polarizer with multiple functionality sections, showing difference in substrate between the wires, in accordance with an embodiment of the present invention.

As shown in FIG. 5, a wire grid polarizer 50 can include a difference in substrate between the wires 13. At least one section can have the substrate 11 etched between the wires 13e, thus forming substrate ribs 51c. At least one section can have wires 13f disposed in channels formed between substrate ribs 51d, as described more fully in U.S. Patent Application No. 61/428,555, filed on Dec. 30, 2010, incorporated herein by reference. As shown in FIG. 4, at least one section can have no substrate etch 51a between the wires 13c.

U.S. Patent Application No. 61/384,802, filed on Sep. 21, 2010, incorporated herein by reference, shows a stepped substrate shape. A difference in substrate between the wires can include different substrate heights and whether or not substrate exists in the gaps between wires as shown in the 61/384,802 application.

Differences between sections regarding substrate 11 between the wires can include depth of substrate etch, whether or not the substrate was etched at all between wires, whether the wires are disposed between substrate ribs 51d or on top of substrate ribs 51c, and/or the shape of the substrate ribs. Regarding the shape of the substrate ribs, their shape may be modified by selection of isotropic or anisotropic etches as will be described more fully regarding cross-sectional shape of wires.

For simplicity of description of the term etch into the substrate, the "substrate" could be a single material or could include multiple layers of materials. For example, an etch into the substrate could include, or could solely be, an etch into thin films disposed between the main substrate material 11 and the wires 13. Etching into the substrate between the wires is described in U.S. Pat. No. 6,122,103 incorporated herein by reference.

Figure 6:
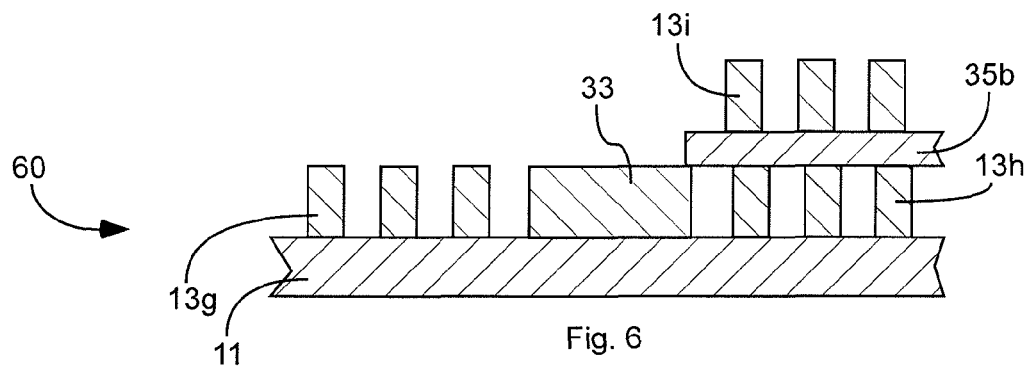
FIG. 6 is a schematic cross-sectional side view of a wire grid polarizer with multiple functionality sections, showing difference in number of layers of separate wires, in accordance with an embodiment of the present invention.

As shown in FIG. 6, a wire grid polarizer 60 can include a difference in number of layers of separate wires 13. For example, as shown in FIG. 6, at least one section can have a single layer of wires 13g and at least one other section can have two or more layers of separate wires 13h-i. A single layer of wires 13g can be better for transmission and multiple layers of wires 13h-i can be better for contrast.

Figure 7:
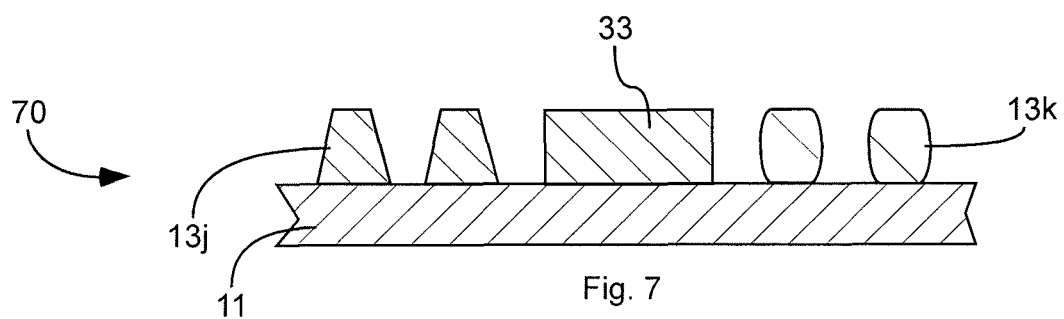
FIG. 7 is a schematic cross-sectional side view of a wire grid polarizer with multiple functionality sections, showing difference in wire cross-sectional shape, in accordance with an embodiment of the present invention.

As shown in FIG. 7, a wire grid polarizer 70 can include a difference in wire cross-sectional shape. At least one shape can be non-rectangular. Although wires 13a-i in FIGS. 3-6 are shown with rectangular cross-sectional shape, wires can have other shapes. For example, the trapezoid shaped wires 13j can be made by an initial strong isotropic etch which is gradually reduced in strength as the etch progresses. The wires 13k with curved sides can be made by an initial isotropic etch which is gradually reduced in strength as the etch progresses, then an increase in isotropic strength towards the end of the etch. Etch techniques for making various shaped cavities are described in US Patent Publication Number 2010/0118390 and U.S. patent application No. 61/114,322, both incorporated herein by reference. These etch techniques can be applied to make various shaped wires.

Figure 8:
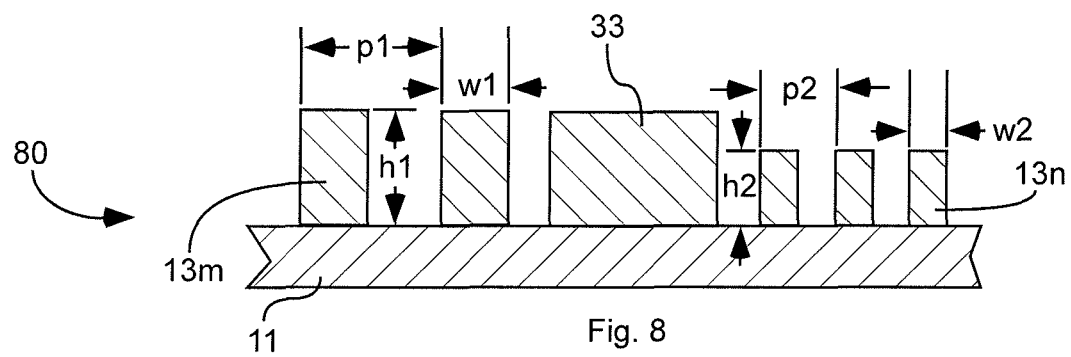
FIG. 8 is a schematic cross-sectional side view of a wire grid polarizer with multiple functionality sections, showing difference in width, height, and/or pitch, in accordance with an embodiment of the present invention.

As shown in FIG. 8, a wire grid polarizer 80 can include a difference in pitch p, a difference in wire width w, and/or a difference in wire height h. For example, one section of wires 13m in FIG. 8 has larger height h, larger pitch p, and larger width w than another section of wires 13n (h1>h2, p1>p2, w1>w2).

In one embodiment, the difference in pitch p can be at least 10 nanometers. In another embodiment, the difference in pitch p can be at least 50 nanometers. In another embodiment, the difference in pitch p can be at least 200 nanometers.

In one embodiment, the difference in width w can be at least 10 nanometers. In another embodiment, the difference in width w can be at least 50 nanometers. In another embodiment, the difference in width w can be at least 200 nanometers.

In one embodiment, the difference in height h can be at least 10 nanometers. In another embodiment, the difference in height h can be at least 50 nanometers. In another embodiment, the difference in height h can be at least 200 nanometers.

Another difference between wire grid sections is a difference in wire material. For example, at least one section of wires 13 can comprise aluminum and at least one other section can comprise silver. At least one section can be optimized for one wavelength or group of wavelengths and at least one other section can be optimized for another wavelength or group of wavelengths. At least one section can have wires 13 that comprise layers of different materials and at least one other section can comprise wires 13 made of a single material.

For efficient polarization of light, wire pitch should be less than about one third the wavelength of incoming light. In one embodiment, at least one section has a pitch that is less than 150 nanometers. In another embodiment, at least one section has a pitch that is less than 120 nanometers. In another embodiment, at least one section has a pitch that is less than 90 nanometers. In another embodiment, at least one section has a pitch that is less than 70 nanometers. In another embodiment, at least one section has a pitch that is less than 40 nanometers. U.S. Patent Application Nos. 61/384,802 and 61/384,796, both filed on Sep. 21, 2010, incorporated herein by reference, show how to make wire grid polarizers with very small pitch, such as less than 40 nanometers.

How to Make

Wire grid polarizers with multiple functionality sections can be made by masking off certain sections while leaving other sections uncovered.

For example, a resist or oxide can be patterned to leave a section or multiple sections open. Metal can be applied through sputter to the open sections. The metal can be patterned and etched. Coatings can be added if desired. The resist or oxide can be removed or lifted off. The sections that had the original wire grids can then be masked off and the procedure of adding wires can be repeated, but with different characteristics, for the new, opened, sections. This process can be repeated for as many different sections with different wire characteristics as desired.

As another example, if all wires will be made of the same metal, then the metal can first be applied to a substrate. A resist or oxide can be patterned to leave a section or multiple sections open. The metal can be patterned and etched. Coatings can be added if desired. The resist or oxide can be removed or lifted off. The sections that had the original wire grids can then be masked off and the procedure of adding wires can be repeated, but with different characteristics, for the new, opened, sections.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

What is claimed is:

1. A wire grid polarizer, comprising:
   a substrate;
   at least two separate and discrete sections of different wire grids disposed laterally with respect to one another over and attached to the substrate;
   the wire grids of each section comprising a plurality of substantially parallel elongated wires disposed over the substrate; and
   the at least two separate and discrete sections of different wire grids having a different wire grid structure with respect to one another, wherein the different structure comprises at least one of:
   a difference in wire material;
   a difference in coating on top of the wires;

a difference in thin film between the wires and the substrate;
a difference in substrate between the wires;
a difference in number of layers of separate wires; or
a combinations thereof.

2. The polarizer of claim 1, wherein the different structure also includes at least one of:
a difference in angular orientation of the wire grids between the at least two sections; or
a difference in wire cross-sectional shape wherein at least one shape is non-rectangular; or
a difference in pitch of at least 10 nanometers; or
a difference in wire width of at least 10 nanometers; or
a difference in wire height of at least 10 nanometers.

3. The polarizer of claim 2, wherein the different structure includes the difference in coating on top of the wires and difference in pitch of at least 10 nanometers.

4. The polarizer of claim 1, wherein the different structure includes a difference in wire material.

5. The polarizer of claim 1, wherein the different structure includes a difference in coating on top of the wires.

6. The polarizer of claim 1, wherein the different structure includes a difference in thin film between the wires and the substrate.

7. The polarizer of claim 1, wherein the different structure includes a difference in substrate between the wires.

8. The polarizer of claim 1, wherein the different structure includes a difference in number of layers of separate wires.

9. The polarizer of claim 1, wherein the different structure includes at least two of:
the difference in wire material; or
the difference in coating on top of the wires; or
the difference in thin film between the wires and the substrate; or
the difference in substrate between the wires; or
the difference in number of layers of separate wires.

10. The polarizer of claim 1, wherein at least one of the wire grid sections has wires with a pitch that is less than 150 nanometers.

11. The polarizer of claim 1, wherein at least one of the wire grid sections has wires with a pitch that is less than 90 nanometers.

12. The polarizer of claim 1, wherein a boundary region exists between the at least two separate and discrete sections wherein no wire grid is present.

13. A wire grid polarizer, comprising:
a substrate;
at least two separate and discrete sections of different wire grids disposed laterally with respect to one another over and attached to the substrate;
a boundary region exists between the at least two separate and discrete sections wherein no wire grid is present;
the wire grids of each section comprising a plurality of substantially parallel elongated wires disposed over the substrate; and
a different wire grid structure between the at least two sections, wherein the different structure comprises at least one of:
a difference in pitch of at least 10 nanometers;
a difference in wire width of at least 10 nanometers;
a difference in wire height of at least 10 nanometers;
a difference in wire material;
a difference in coating on top of the wires;
a difference in thin film between the wires and the substrate;
a difference in substrate between the wires;
a difference in number of layers of separate wires; or
a combinations thereof.

14. The polarizer of claim 13, further comprising a difference in angular orientation between the at least two different sections such that the wires of one of the sections extend longitudinally in a different direction than wires of the other section.

15. The polarizer of claim 13, wherein the different structure includes at least one of:
a difference in pitch of at least 50 nanometers; or
a difference in wire width of at least 50 nanometers; or
a difference in wire height of at least 50 nanometers; or
a combinations thereof.

16. The polarizer of claim 13, wherein the different structure includes at least one of:
a difference in pitch of at least 200 nanometers; or
a difference in wire width of at least 200 nanometers; or
a difference in wire height of at least 200 nanometers; or
a combinations thereof.

17. The polarizer of claim 13, wherein the different structure includes at least three differences selected from the group consisting of:
the difference in pitch of at least 10 nanometers;
the difference in wire width of at least 10 nanometers;
the difference in wire height of at least 10 nanometers;
the difference in wire material;
the difference in coating on top of the wires;
the difference in thin film between the wires and the substrate;
the difference in substrate between the wires;
the difference in number of layers of separate wires;
a difference in wire cross-sectional shape wherein at least one shape is non-rectangular; and
a difference in angular orientation.

18. The polarizer of claim 13, wherein at least one of the wire grid sections has wires with a pitch that is less than 150 nanometers.

19. The polarizer of claim 13, wherein at least one of the wire grid sections has wires with a pitch that is less than 90 nanometers.

20. A wire grid polarizer, comprising:
a substrate;
at least two separate sections of different wire grids disposed laterally with respect to one another over and attached to the substrate;
the wire grids of each section comprising a plurality of substantially parallel elongated wires disposed over the substrate; and
a different wire grid structure between the at least two separate sections, wherein the different structure comprises at least one of:
a difference in wire material;
a difference in coating on top of the wires;
a difference in thin film between the wires and the substrate;
a difference in substrate between the wires;
a difference in wire cross-sectional shape wherein at least one shape is non-rectangular;
a difference in number of layers of separate wires; or
a combinations thereof.

* * * * *